US012145176B1

(12) United States Patent
Costo

(10) Patent No.: US 12,145,176 B1
(45) Date of Patent: Nov. 19, 2024

(54) PORTABLE FIREHOSE CLEANING APPARATUS

(71) Applicant: Henry Costo, Gulf Shores, AL (US)

(72) Inventor: Henry Costo, Gulf Shores, AL (US)

(73) Assignee: Costo Fire Consulting, LLC, Gulf Shores, AL (US)

( * ) Notice: Subject to any disclaimer, the term of this patent is extended or adjusted under 35 U.S.C. 154(b) by 342 days.

(21) Appl. No.: 17/682,317

(22) Filed: Feb. 28, 2022

(51) Int. Cl.

| | |
|---|---|
| ***B08B 1/12*** | (2024.01) |
| ***B08B 1/20*** | (2024.01) |
| ***B08B 3/02*** | (2006.01) |

(52) U.S. Cl.
CPC .................. *B08B 1/12* (2024.01); *B08B 1/20* (2024.01); *B08B 3/022* (2013.01); *B08B 2203/0217* (2013.01); *B08B 2240/00* (2013.01)

(58) Field of Classification Search
CPC .............. B08B 1/12; B08B 1/20; B08B 3/022
See application file for complete search history.

(56) References Cited

U.S. PATENT DOCUMENTS

| | | | | |
|---|---|---|---|---|
| 2,925,689 A * | 2/1960 | Peterson | B08B 1/20 451/103 |
| 4,129,919 A * | 12/1978 | Fitch | H05K 3/26 451/190 |
| 5,231,726 A * | 8/1993 | McKenney | B08B 1/20 15/77 |
| 5,299,587 A * | 4/1994 | Randall | B08B 3/045 134/143 |
| 2003/0217429 A1* | 11/2003 | Larson | B24B 13/02 15/302 |
| 2017/0164564 A1* | 6/2017 | Harwood | B08B 1/20 |
| 2019/0009309 A1* | 1/2019 | Rickey | B08B 3/028 |
| 2019/0344205 A1* | 11/2019 | Hicks | B08B 9/00 |
| 2020/0215581 A1* | 7/2020 | Ostler | B08B 3/02 |
| 2021/0213313 A1 | 7/2021 | Ostler | |

FOREIGN PATENT DOCUMENTS

| | | | |
|---|---|---|---|
| CN | 212733164 | 3/2021 | |
| CN | 212998108 | 4/2021 | |
| CN | 112245851 | 1/2022 | |
| CN | 111991740 | 2/2022 | |
| CN | 211247534 | 8/2022 | |
| CN | 211611419 | 10/2022 | |
| DE | 102004048491 A1 * | 4/2006 | A62C 33/02 |

OTHER PUBLICATIONS

DE102004048491A1 (machine translation) (Year: 2006).*

* cited by examiner

*Primary Examiner* — Andrew A Horton
(74) *Attorney, Agent, or Firm* — Dority & Manning, P.A.

(57) ABSTRACT

A firehose cleaning apparatus containing a washing chamber including optionally a plurality of rotating brushes and a plurality of spray nozzles. The firehose cleaning apparatus is constructed so as to permit a firehose to be fed through the washing chamber for cleaning. The firehose cleaning apparatus is portable and can be moved in accordance with user preference.

19 Claims, 4 Drawing Sheets

PORTABLE FIREHOSE CLEANING APPARATUS

BACKGROUND

The rates of cancer in firefighters are substantially greater than that of the general population. Indeed, the rates of digestive, oral, respiratory, and urinary cancers have been institutionally verified to be substantially greater in firefighters when compared to the rates of cancer in the general population.

In their occupation, firefighters may be exposed to hundreds of different chemicals in the form of gases, vapors, and particulates. Undoubtedly, the increased number of synthetics utilized in homes and businesses has resulted in a more complex range of combustion products, many of which are hazardous. The hazardous substances may be byproducts of combustion and burning, such as polycyclic aromatic hydrocarbons, while others may come directly from the materials comprising the burning building or structure, such as asbestos. Contact with these hazardous substances may occur by inhalation, dermal absorption, ingestion, and more generally any method by which a gas, vapor, or particulate may enter the human body.

The personal protective equipment utilized by firefighters is also exposed to hazardous substances. Many of these hazardous substances adhere to the personal protective equipment of firefighters resulting in an increased risk of exposure to both the firefighter and anyone coming into either direct or indirect contact with the firefighter or the firefighter's equipment. Further, these hazardous substances may also adhere to other equipment utilized by firefighters such as firetrucks, firehoses, and ladders. For example, interior attack hose lines are particularly susceptible to picking up carcinogenic contaminants.

In view of the above, those skilled in the art have developed cleaning apparatuses and cleaning procedures to ensure that the equipment utilized by firefighters does not compromise the health and safety of firefighters. However, firehoses have presented a particularly difficult problem resulting from the difficulty of properly cleaning a shifting cylindrical structure without exposing the cleaning operator to the hazardous substances adhered to the firehose. Indeed, firehoses are generally cleaned in a manner that both exposes the cleaning operator to the hazardous substances adhered to the firehose and that does not thoroughly clean the firehose as to ensure that the firehose does not compromise the health and safety of firefighters. Further, firehoses are generally cleaned after they have been transported back to the fire station, which can expose objects and persons in close proximity to the fire station to the hazardous substances adhered to the firehose.

In view of the above, a need exists for an improved firehose cleaning apparatus.

SUMMARY

In general, the present disclosure is directed to a firehose cleaning apparatus comprising a portable housing defining a washing chamber. A hose inlet on one side of the housing and a hose outlet on an opposite side of the housing, the hose inlet and hose outlet for feeding a firehose through the washing chamber. A first rotating brush is spaced from a second rotating brush within the washing chamber, where the first rotating brush and the second rotating brush are positioned to contact opposite sides of a firehose being fed through the hose inlet and out through the hose outlet. A water inlet is configured to be connected to a water source. At least a first nozzle is spaced from a second nozzle within the washing chamber. For example, the washing chamber can include two nozzles, four nozzles, six nozzles, eight nozzles or the like. The first set of nozzles are positioned above a firehose being fed through the washing chamber, and a second set of nozzles are positioned below a firehose being fed through the washing chamber. The plurality of nozzles are in fluid communication with the water inlet. A power source is provided for rotating the first rotating brush and the second rotating brush. A water outlet is for discharging liquid from the washing chamber.

In one aspect, the first rotating brush and the second rotating brush can be positioned to apply a force to a firehose being fed through the washing chamber to automatically advance a firehose through the washing chamber.

Further, in one aspect, the apparatus can be powered by a rechargeable battery removably held in the housing.

As previously disclosed, the firehose cleaning apparatus can contain a water outlet. In one aspect, the water outlet is positioned at the bottom of the washing chamber. An outlet hose can be attached to the outlet for discharging the washing fluid away from the cleaning apparatus.

The plurality of nozzles can be connected to a water source at a pressure from about 60 psi to about 110 psi. The pressure of water exiting the nozzles can be greater than about 130 psi, such as greater than about 150 psi, such as greater than about 170 psi.

Further, in one aspect, the first rotating brush and the second rotating brush can have a rotational speed from about 100 rpm to about 2000 rpm, such as from about 300 rpm to about 1000 rpm. In one aspect, the first rotating brush and the second rotating brush can each have a plurality of brush bristles from about 2 inches to about 6 inches in length. Additionally, the brush bristles can be each from about 1/120 inches to about 3/10 inches in diameter. The brush bristles can be comprised of nylon, polyester, or a combination thereof.

In one aspect, the washing chamber can be shaped generally in a circular configuration, such as an octagon.

Further, in one aspect, the housing can be connected to a tube frame. The tube frame can extend further out than the washing chamber.

The housing can comprise a retractable handle. Additionally, the housing can comprise an at least one extendable stabilizer. The housing can also comprise a rotatably mounted wheel enabling the user to move the apparatus.

The present disclosure, in one aspect, is directed to a method for cleaning a firehose with the firehose cleaning apparatus. The method can include connecting the apparatus to the water source, feeding a firehose through the washing chamber, washing a firehose with water emanating from a plurality of nozzles positioned above and below the firehose, and simultaneously removing firehose contaminants with the first rotating brush and the second rotating brush.

In another aspect, the aforementioned method further comprises presoaking the firehose with a cleaning composition prior to feeding the firehose through the washing chamber. The cleaning composition can be a detergent, a soap, or a combination thereof. The cleaning composition can be contained in a removable reservoir attached to the cleaning apparatus.

BRIEF DESCRIPTION OF THE DRAWINGS

A full and enabling disclosure of the present disclosure is set forth more particularly in the remainder of the specification, including reference to the accompanying figures, in which.

Figure 1:
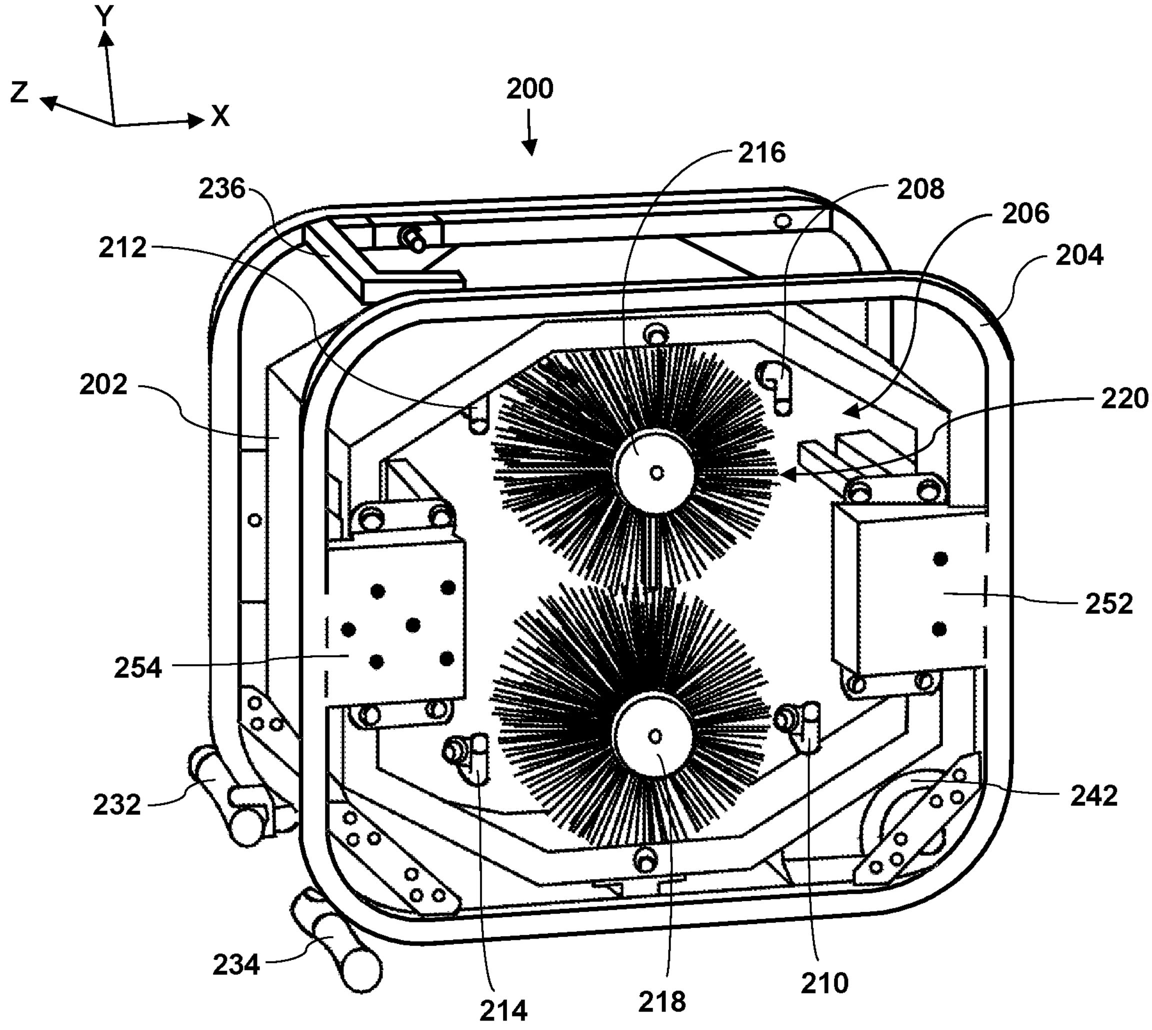
FIG. 1 is a perspective view of the firehose cleaning apparatus.

Repeat use of reference characters in the present specification and drawings is intended to represent the same or analogous features or elements of the present disclosure

DETAILED DESCRIPTION

It is to be understood by one of ordinary skill in the art that the present discussion is a description of exemplary embodiments only and is not intended as limiting the broader aspects of the present disclosure.

In general, the present disclosure is directed to a firehose cleaning apparatus comprising a portable housing defining a washing chamber. A hose inlet on one side of the housing and a hose outlet on an opposite side of the housing, the hose inlet and hose outlet for feeding a firehose through the washing chamber. A first rotating brush spaced from a second rotating brush within the washing chamber, where the first rotating brush and the second rotating brush are positioned to contact opposite sides of a firehose being fed through the hose inlet and out through the hose outlet. A water inlet is configured to be connected to a water source. The washing chamber contains at least one nozzle for emitting high pressure water on to a hose being fed through the chamber. For example, the washing chamber can include multiple pairs of nozzles where one nozzle is positioned above a corresponding nozzle. In various aspects, the washing chamber can include at least 2 nozzles, such as at least 4 nozzles, such as at least 6 nozzles, such as at least 8 nozzles. A power source can be associated with the apparatus for rotating the first rotating brush and the second rotating brush. The apparatus can further include a water outlet for discharging liquid from the washing chamber. The water or cleaning fluid outlet can be connected to a discharge hose for directing the cleaning fluid to a sewer entrance or away from the operators of the apparatus.

The design of the firehose cleaning apparatus provides numerous advantages and benefits. Generally, the design of the firehose cleaning apparatus enhances the portability of the firehose cleaning apparatus and minimizes contaminant spread to humans and, more generally, to the surroundings of the firehose cleaning apparatus.

Referring to FIGS. 1-4, aspects of a firehose cleaning apparatus made in accordance with the present disclosure are shown. Referring to FIG. 1, the firehose cleaning apparatus 200 is shown. The firehose cleaning apparatus 200 can include a tube frame 204 extending further out than the washing chamber 206 and can also include a retractable handle 236. The washing chamber 206 can include a first rotating brush 216 and a second rotating brush 218. The first rotating brush 216 and the second rotating brush 218 can comprise a plurality of brush bristles 220. The washing chamber 206 can further include a first nozzle 208, a second nozzle 210, a third nozzle 212, and a fourth nozzle 214. The firehose cleaning apparatus 200 can include a first extendable stabilizer 232 and a second extendable stabilizer 234. Additionally, the firehose cleaning apparatus 200 can include a second rotatably mounted wheel 242. The housing 202 can also be connected to the tube frame 204 by a third tube frame mount 252 and a fourth tube frame mount 254.

In one aspect, the tube frame 204 can extend further out than the washing chamber 206. The tube frame 204 can generally protect and support the washing chamber 206. Additionally, the tube frame 204 can provide a frame to which various components of the firehose cleaning apparatus 200 can be mounted. For instance, the at least one extendable stabilizer, such as a first extendable stabilizer 232 and a second extendable stabilizer 234, can be mounted on the tube frame 204. Additionally, for instance, a rotatably mounted wheel, such as a first rotatably mounted wheel 240 and a second rotatably mounted wheel 242, can be mounted on the tube frame 204. Further, for instance, the retractable handle 236 can be mounted on the tube frame 204. The tube frame 204 can also act as a stabilizer for the firehose cleaning apparatus 200 further minimizing movement of the firehose cleaning apparatus when in a stationary position, such as when the firehose cleaning apparatus is in operation.

Further, the tube frame 204 can be configured to distance the water outlet from the ground from about 1 inch to about 8 inches in distance, such as greater than about 1 inch in distance, such as greater than about 2 inches in distance, such as greater than about 3 inches in distance, such as greater than about 4 inches in distance, such as greater than about 5 inches in distance, such as greater than about 6 inches in distance, such as greater than about 7 inches in distance. In general, the distance from the water outlet to the ground can be less than about 8 inches in distance, such as less than about 7 inches in distance, such as less than about 6 inches in distance, such as less than about 5 inches in distance, such as less than about 4 inches in distance, such as less than about 3 inches in distance, such as less than about 2 inches in distance. Notably, a lower distance from the water outlet to the ground can result in decreased discharge splash, which can decrease contact of firehose contaminants with the user or users of the firehose cleaning apparatus 200. In one aspect, the water outlet can be configured to be connected to a discharge tube for discharging water away from the apparatus. For instance, the discharge tube can have a length sufficient to reach to a nearby sewer inlet. Discharging water away from the apparatus during cold weather can also prevent ice buildup in the location of the operators and fire service personnel.

The tube frame 204 can be comprised of stainless steel, carbon steel, or alloy steel. In one aspect, the tube frame 204 is comprised of stainless steel. Stainless steel can provide resistance to corrosion and oxidation. Considering the firehose cleaning apparatus 200 can be exposed to moisture and contaminants, the resistance to corrosion and oxidation can be beneficial to the firehose cleaning apparatus.

As previously disclosed, the housing 202 can be connected to the tube frame 204. The housing 202 can be connected to the tube frame 204 by at least one tube frame mount. The at least one tube frame mount can include a first tube frame mount 248, a second tube frame mount 250, a third tube frame mount 252, and/or a fourth tube frame mount 254.

The housing 202 is generally in a circular configuration, such as an octagon. Further, in one aspect, the housing 202 can comprise a retractable handle 236, an at least one extendable stabilizer, such as a first extendable stabilizer 232 and a second extendable stabilizer 234, and/or a rotatably mounted wheel, such as a first rotatably mounted wheel 240 and a second rotatably mounted wheel 242, enabling the user to move the firehose cleaning apparatus 200.

The housing 202 can be comprised of stainless steel, carbon steel, or alloy steel. In one aspect, the housing 202 is comprised of stainless steel. Stainless steel can provide resistance to corrosion and oxidation. Considering the firehose cleaning apparatus 200 can be exposed to moisture and contaminants, the resistance to corrosion and oxidation can be beneficial to the firehose cleaning apparatus.

As previously disclosed, the firehose cleaning apparatus 200 is portable. Generally, the firehose cleaning apparatus 200 is characterized as portable as it can be readily moved by the user. In one aspect, the firehose cleaning apparatus 200 can contain a rotatably mounted wheel to improve portability.

The rotatably mounted wheel can be mounted to various segments of the firehose cleaning apparatus 200. For instance, the rotatably mounted wheel can be mounted to the housing 202 of the firehose cleaning apparatus 200. In one aspect, the rotatably mounted wheel can be mounted to the tube frame 204 of the firehose cleaning apparatus 200. In another aspect, more than one rotatably mounted wheel is mounted on the firehose cleaning apparatus 200. For instance, the firehose cleaning apparatus 200 may comprise a first rotatably mounted wheel 240, a second rotatably mounted wheel 242, a third rotatably mounted wheel, and/or a fourth rotatably mounted wheel.

In general, the tread composition of the rotatably mounted wheel can comprise rubber, plastic, or a combination thereof.

In one aspect, the firehose cleaning apparatus 200 can comprise a retractable handle 236. The retractable handle 236 can be utilized by the user to readily move the firehose cleaning apparatus 200. Further, the retractable handle 236 can be mounted to the housing 202 of the firehose cleaning apparatus 200. In one aspect, the retractable handle 236 can be mounted to the tube frame 204 of the firehose cleaning apparatus 200. The retractable handle 236 can be configured to permit the user to grasp the retractable handle 236 in an underhand, overhand, or neutral grip. These various gripping techniques allow the user to grasp the retractable handle 236 in a manner that generally permits efficient portability of the firehose cleaning apparatus 200. Further, the retractable handle 236 can be extended from the housing 202 of the firehose cleaning apparatus 200. When not extended, the retractable handle 236 is in a collapsed position. In one aspect, the retractable handle 236 is collapsed to be generally flush with the tube frame 204 of the firehose cleaning apparatus 200.

As previously disclosed, the firehose cleaning apparatus 200 can also comprise an at least one extendable stabilizer. The at least one extendable stabilizer can be utilized to limit the movement of the firehose cleaning apparatus 200 when the firehose cleaning apparatus is stationary, such as when the firehose cleaning apparatus is in operation. In one aspect, the firehose cleaning apparatus 200 comprises more than one extendable stabilizer. For instance, the firehose cleaning apparatus 200 may comprise a first extendable stabilizer 232, a second extendable stabilizer 234, a third extendable stabilizer, and/or a fourth extendable stabilizer.

The firehose cleaning apparatus 200 of the present disclosure comprises a washing chamber 206. In one aspect, the washing chamber 206 is generally in a circular configuration, such as an octagon. The circular configuration of the washing chamber 206 can permit the water emanating from the first nozzle 208, the second nozzle 210, the third nozzle 212, and the fourth nozzle 214 to conveniently flow to the water outlet for discharge. Further, the circular configuration can limit contaminate build-up when compared to parallelograms, such as squares or rectangles. The vertex angles of a circular configuration, such as an octagon, are generally larger than that of parallelograms and are particularly larger than that of a rectangle or square. The larger vertex angles demonstrated by a generally circular configuration can prevent contaminant build-up at the vertexes of the washing chamber 206 further ensuring contaminants are discharged from the washing chamber and further minimizing the accumulation of contaminants at the vertexes of the washing chamber.

Generally, the firehose cleaning apparatus 200 of the present disclosure can also comprise a first rotating brush 216 and a second rotating brush 218. The first rotating brush 216 and the second rotating brush 218 spaced apart as to be positioned to contact opposite sides of a firehose being fed through the hose inlet 222 and out through the hose outlet. Further, in one aspect, the first rotating brush 216 and the second rotating brush 218 can be generally parallel to one another.

In one aspect, the first rotating brush 216 and the second rotating brush 218 are positioned to apply a force to a firehose being fed through the washing chamber 206 to automatically advance the firehose through the washing chamber. Notably, the capability of the first rotating brush 216 and the second rotating brush 218 to automatically advance the firehose through the washing chamber 206 can minimize user contact with the firehose and can further facilitate the movement of the firehose through the washing chamber. The minimization of user contact with the firehose may decrease contaminant contact with the user and the user's surroundings.

In one aspect, the first rotating brush 216 and the second rotating brush 218 can comprise a plurality of brush bristles 220, the plurality of brush bristles being from about 2 inches to about 6 inches in length, such as from about 2 inches to about 3 inches in length, such as from about 3 inches to about 4 inches in length, such as from about 4 inches to about 5 inches in length, such as from about 5 inches to about 6 inches in length. Notably, the length of the brush bristles 220 can be understood to affect the cleaning characteristics of the firehose cleaning apparatus 200. Indeed, the variation of the bristle tip contact angle and bristle tip normal force, which are both partially dependent on the bristle length, can provide enhanced cleaning performance of a firehose.

Further, in one aspect, the first rotating brush 216 and the second rotating brush 218 comprise a plurality of brush bristles 220 where the brush bristles are each from about 1/120 inches to about 36/120, or 3/10, inches in diameter, such as greater than about 1/120 inches in diameter, such as greater than about 4/120 inches in diameter, such as greater than about 8/120 inches in diameter, such as greater than about 12/120 inches in diameter, such as greater than about 16/120 inches in diameter, such as greater than about 20/120 inches in diameter, such as greater than about 24/120 inches in diameter, such as greater than about 28/120 inches in diameter, such as greater than about 32/120 inches in diameter. The diameter of the individual brush bristles of the first rotating brush 216 and the second rotating brush 218 is generally less than about 36/120 inches in diameter, such as less than about 32/120 inches in diameter, such as less than about 28/120 inches in diameter, such as less than about 24/120 inches in diameter, such as less than about 20/120 inches in diameter, such as less than about 16/120 inches in diameter, such as less than about 12/120 inches in diameter, such as less than about 8/120 inches in diameter, such as less than about 4/120 inches in diameter.

The diameter of brush bristles 220 can affect the bristle tip normal force. In general, assuming acceleration is constant, an increase in the diameter of a brush bristle increases the mass of a brush bristle which in turn increases the force of the brush bristle. The increased force of the brush bristle can provide enhanced cleaning capabilities to the firehose cleaning apparatus 200.

In one aspect, the first rotating brush 216 and second rotating brush 218 can have a rotational speed from about 100 rpm to about 2000 rpm, such as greater than about 100 rpm, such as greater than about 200 rpm, such as greater than about 300 rpm, such as greater than about 400 rpm, such as greater than about 500 rpm, such as greater than about 600 rpm, such as greater than about 700 rpm, such as greater than about 800 rpm, such as greater than about 900 rpm, such as greater than about 1000 rpm, such as greater than about 1100 rpm, such as greater than about 1200 rpm, such as greater than about 1300 rpm, such as greater than about 1400 rpm, such as greater than about 1500 rpm, such as greater than about 1600 rpm, such as greater than about 1700 rpm, such as greater than about 1800 rpm, such as greater than about 1900 rpm. The rotational speed of the first rotating brush 216 and the second rotating brush 218 is generally less than about 2000 rpm, such as less than about 1900 rpm, such as less than about 1800 rpm, such as less than about 1700 rpm, such as less than about 1600 rpm, such as less than about 1500 rpm, such as less than about 1400 rpm, such as less than about 1300 rpm, such as less than about 1200 rpm, such as less than about 1100 rpm, such as less than about 1000 rpm, such as less than about 900 rpm, such as less than about 800 rpm, such as less than about 700 rpm, such as less than about 600 rpm, such as less than about 500 rpm, such as less than about 400 rpm, such as less than about 300 rpm, such as less than about 200 rpm. In one aspect, the first rotating brush 216 and the second rotating brush 218 have a rotational speed from about 300 rpm to about 1000 rpm.

In general, the brush bristles 220 of the present disclosure are comprised of nylon, polyester, or a combination thereof.

In one aspect, the firehose cleaning apparatus 200 can comprise a third rotating brush and a fourth rotating brush. The third rotating brush and fourth rotating brush can be configured to further enhance contaminate removal from the firehose. For instance, the third rotating brush and fourth rotating brush can be configured to contact opposite sides of a firehose. Further, the third rotating brush and the fourth rotating brush can be configured to be generally parallel with one another.

In one aspect, the firehose cleaning apparatus 200 can comprise a first nozzle 208 and a second nozzle 210. The first nozzle 208 and the second nozzle 210 can be positioned in a variety of configurations. Generally, the various configurations permit the first nozzle 208 and the second nozzle 210 to clean the entirety of the firehose, including opposite sides of the firehose, such as the top and the bottom of the firehose. For instance, the first nozzle 208 can be positioned in the washing chamber 206 to be above the firehose. For instance, the second nozzle 210 can be positioned in the washing chamber 206 to be below the firehose.

Generally, the first nozzle 208 and the second nozzle 210 can be adjustably mounted so that they can be configured to emit water that contacts the firehose at a particular angle. Notably, the contact angle of the emitted water from the first nozzle 208 and the second nozzle 210 can change the cleaning characteristics of the firehose cleaning apparatus 200.

The first nozzle 208 and the second nozzle 210 can be connected to a pressurized water source at a pressure from about 20 psi to about 120 psi, such as greater than about 20 psi, such as greater than about 30 psi, such as greater than about 40 psi, such as greater than about 50 psi, such as greater than about 60 psi, such as greater than about 70 psi, such as greater than about 80 psi, such as greater than about 90 psi, such as greater than about 100 psi, such as greater than about 110 psi. For example, the nozzles can be connected to a pumper truck as opposed to a fire hydrant in order to has a water source at sufficient pressure. In general, the first nozzle 208 and the second nozzle 210 can emit water at a pressure that is greater than the pressure of the water source. For example, water can be emitted from the plurality of nozzles at a pressure greater than about 200 psi, such as greater than about 400 psi, such as greater than about 800 psi, such as greater than about 1000 psi, such as greater than about 1500 psi, such as greater than about 2000 psi, such as greater than about 2500 psi, such as greater than about 3000 psi and generally less than about 5000 psi. In one aspect, the first nozzle 208 and the second nozzle 210 emit water at a pressure from about 800 psi to about 4000 psi.

Additionally, the washing chamber 206 can further comprise a third nozzle 212 and a fourth nozzle 214. The third nozzle 212 and the fourth nozzle 214 can be positioned in a variety of configurations. The third nozzle 212 and the fourth nozzle 214 can be positioned in a configuration that permits the third nozzle to contact one side of the firehose and that permits the fourth nozzle to contact the opposite side of the firehose. For instance, the third nozzle 212 can be positioned in the washing chamber 206 to be above the firehose. For instance, the fourth nozzle 214 can be positioned in the washing chamber 206 to be below the firehose. Generally, the third nozzle 212 and the fourth nozzle 214 can be adjustably mounted so that they can be configured to emit water that contacts the firehose at a particular angle. In other embodiments, the washing chamber can include 6 nozzles, 8 nozzles, 10 nozzles or the like.

Figure 2:
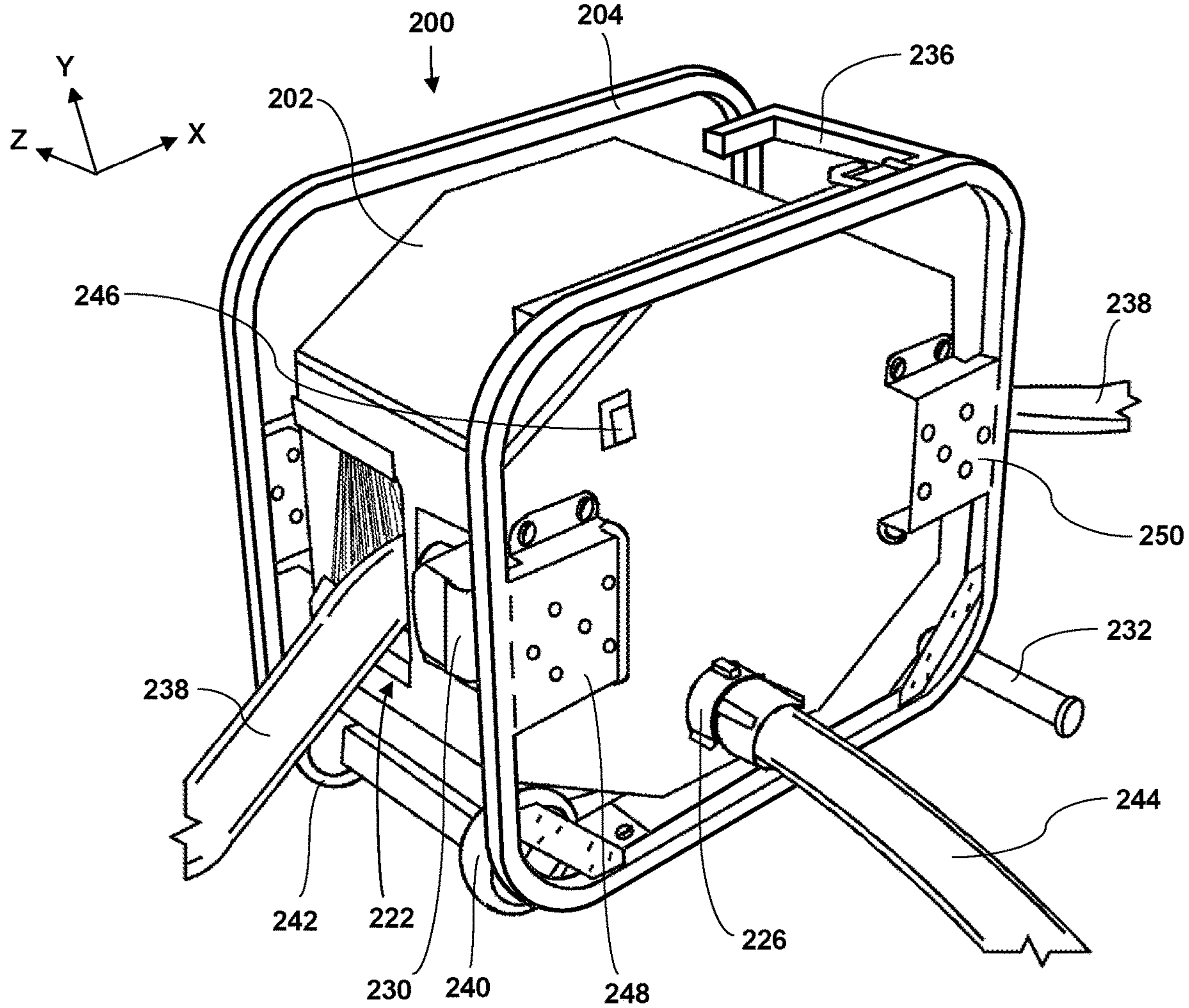
FIG. 2 is a perspective view of the firehose cleaning apparatus.

Referring to FIG. 2, a firehose 238 is shown extending through the washing chamber 206 of the firehose cleaning apparatus 200 while in use. The firehose cleaning apparatus 200 can include a tube frame 204 extending further out than the washing chamber 206 and also can include a retractable handle 236. The firehose cleaning apparatus 200 can include a first extendable stabilizer 232. Additionally, the firehose cleaning apparatus 200 can include a first rotatably mounted wheel 240 and a second rotatably mounted wheel 242. The firehose cleaning apparatus 200 also can include a water inlet 226 and a hose inlet 222. While in use, the water inlet 226 is connected to a water source 244. Further, a power switch 246 is located on the housing 202. The housing 202 can also be connected to the tube frame 204 by a first tube frame mount 248 and a second tube frame mount 250.

As previously disclosed, the firehose cleaning apparatus 200 of the present disclosure can comprise a hose inlet 222 and a hose outlet for feeding a firehose through the washing chamber 206. The hose inlet 222 and the hose outlet can be located at opposing sides of the housing 202. This configuration permits a firehose to be in a generally straight configuration when it is fed through the washing chamber 206. A firehose fed in a straight configuration through the washing chamber 206 can be fed through the washing chamber generally without creases and/or crevices. Notably, the presence of creases and/or crevices can result in the retention of contaminants to the firehose 238. Therefore, the configuration of the firehose cleaning apparatus 200 may result in enhanced cleaning performance.

In one aspect, the hose inlet 222 and the hose outlet are constructed to permit the passage of a firehose with couplings from about 0.75 inches to about 4 inches in size, such as greater than about 0.75 inches in size, such as greater than about 1.5 inches in size, such as greater than about 2.25 inches in size, such as greater than about 3 inches in size, such as greater than about 3.75 inches in size, through the washing chamber 206. In general, the hose inlet 222 and the hose outlet are constructed to permit the passage of a firehose with couplings that are less than about 4 inches in size, such as less than about 3.25 inches in size, such as less than about 2.5 inches in size, such as less than about 1.75 inches in size, such as less than about 1 inch in size, through the washing chamber 206.

In general, the firehose cleaning apparatus 200 includes a water inlet 226 configured to be connected to a water source 244. In one aspect, the water inlet 226 can be configured to be connected to a pumper fire truck or other suitable pressurized fluid source. In one aspect, the first nozzle 208 and second nozzle 210 can be in fluid communication with the water inlet 226.

The firehose cleaning apparatus 200 can also comprise a power source 230. In one aspect, the power source 230 can power the first rotating brush 216 and the second rotating brush 218. The power source 230 can be an alkaline battery, a nickel-metal hydride battery, or a lithium-ion battery. In one aspect, the power source 230 is a rechargeable lithium-ion battery. The utilization of a rechargeable battery removably held in the housing 202 can be beneficial to the firehose cleaning apparatus 200 as it can further enhance the portability of the firehose cleaning apparatus. Generally, the power source 230, which can be a rechargeable lithium-ion battery, and the remainder of the firehose cleaning apparatus 200 can be transported separately because, as previously disclosed, the rechargeable battery is removable. Indeed, the ability to transport the remainder of the firehose cleaning apparatus 200 and the power source 230 separately would result in enhanced portability.

A power switch 246 can be located on the housing 202 of the firehose cleaning apparatus 200 to activate the firehose cleaning apparatus. The power switch 246 can be in electric communication with the power source 230.

The firehose cleaning apparatus 200 of the present disclosure can also comprise a water outlet. The water outlet can be positioned at the bottom of the washing chamber 206. The water emitting from the first nozzle 208 and the second nozzle 210 can be discharged from the washing chamber 206 through the water outlet. The water outlet can be configured to prevent water build-up in the washing chamber 206. In one aspect, the water emitting from the first nozzle 208 and the second nozzle 210 can be discharged through the water outlet from the washing chamber 206 at a higher volumetric flow rate as compared to the volumetric flow rate of water entering the washing chamber. Further, in one aspect, the water outlet is configured to minimize the splash of the discharge against the ground. For instance, the water outlet can be positioned at the bottom of the washing chamber 206, which minimizes fall distance of the discharge. Notably, minimizing the splash of the water discharge can lessen the amount of firehose contaminants coming into contact with the user or users of the firehose cleaning apparatus 200.

In one aspect, with the exception of the hose inlet 222 and the hose outlet, the housing 202 can enclose a portion of a firehose being fed through the washing chamber 206. Notably, the enclosure formed by the housing 202 can mitigate human contact with firehose contaminants that can spread outward from the firehose while the firehose is being cleaned. For instance, the impact of the water emitted from the first nozzle 208 and the second nozzle 210 can result in firehose contaminants spreading from the firehose to its surroundings. Generally, the enclosure formed by the housing 202 can act as a protective barrier between the firehose contaminants and the user or users of the firehose cleaning apparatus 200.

In accordance with the present disclosure, a method of operating the firehose cleaning apparatus 200 can comprise connecting the firehose cleaning apparatus to the water source 244, feeding a firehose through the washing chamber 206, washing a firehose with water emanating from the first nozzle 208 and the second nozzle 210, and simultaneously removing the firehose contaminants with the first rotating brush 216 and the second rotating brush 218. In one embodiment, the cleaning apparatus is attached to a pumper fire truck in order to receive a pressurized water source. In one aspect, the method of operating the firehose cleaning apparatus 200 can have additional steps. For instance, a firehose can be presoaked with a cleaning composition prior to feeding a firehose through the washing chamber 206. The cleaning composition can comprise a detergent, a soap, or a combination thereof. The presoaking of the firehose can result in enhanced firehose contaminant removal when a firehose is fed through the firehose cleaning apparatus 200. In one aspect, a cleaning composition can be contained in a detachable reservoir removably attached to the cleaning apparatus. Alternatively, a cleaning composition reservoir can be in fluid communication with the plurality of nozzles for mixing with water being emitted by the nozzles.

Figure 3:
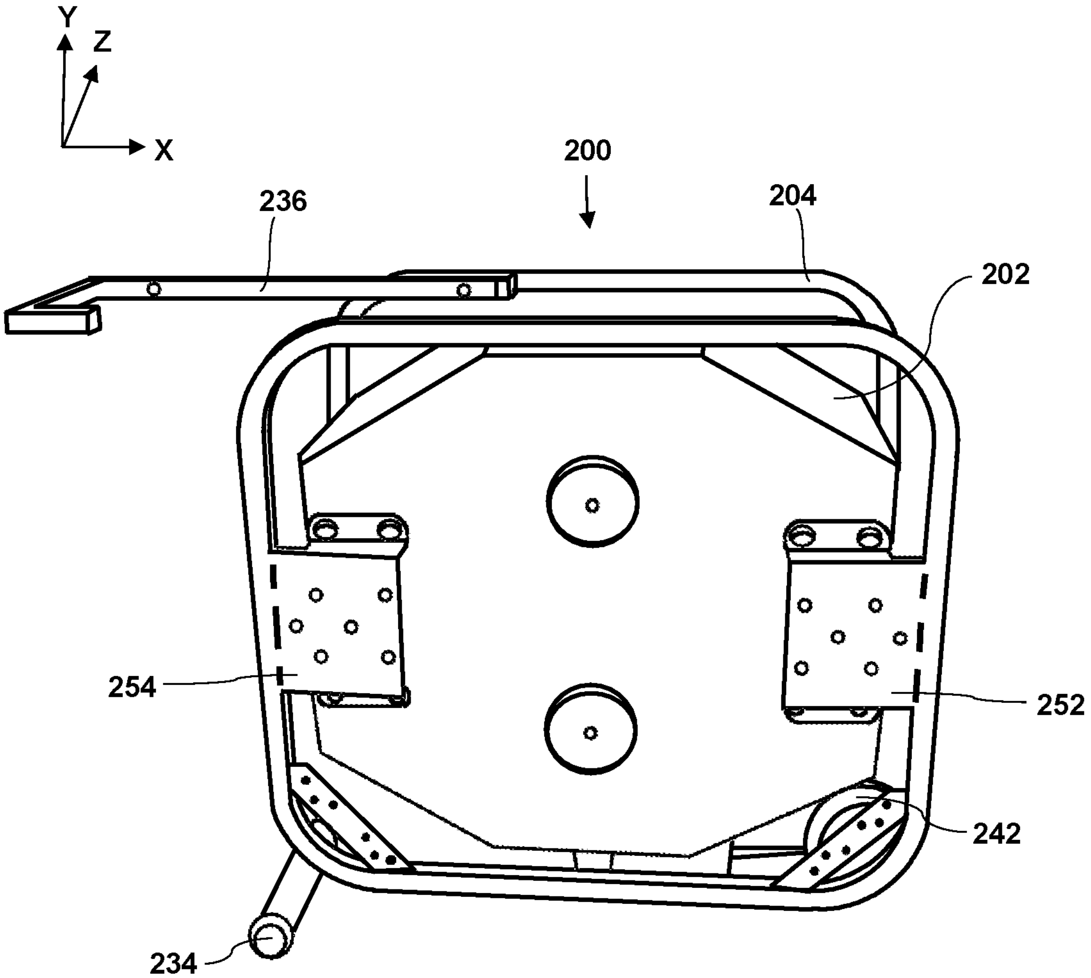
FIG. 3 is a perspective view of the firehose cleaning apparatus.

Referring to FIG. 3, the firehose cleaning apparatus 200 is shown with the retractable handle 236 extended. As previously described, the firehose cleaning apparatus can include a tube frame 204 and a second rotatably mounted wheel 242. The firehose cleaning apparatus 200 can include a second extendable stabilizer 234. The second extendable stabilizer 234 is shown in an extended configuration. The housing 202 can also be connected to the tube frame 204 by a third tube frame mount 252 and a fourth tube frame mount 254.

Figure 4:
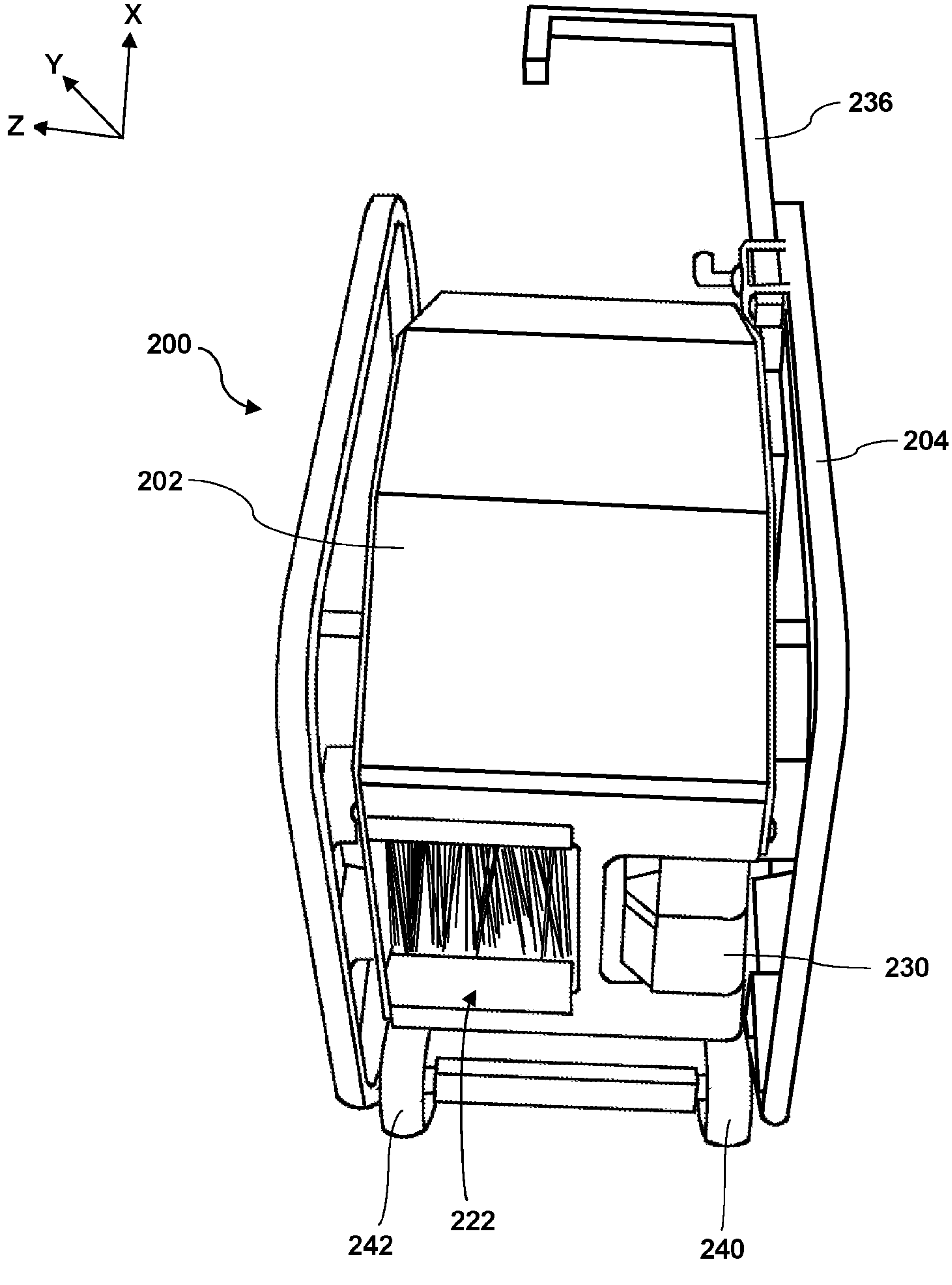
FIG. 4 is a perspective view of the firehose cleaning apparatus.

Referring to FIG. 4, the firehose cleaning apparatus 200 is shown with the retractable handle 236 extended. As previously described, the firehose cleaning apparatus can comprise a housing 202, a first rotatably mounted wheel 240, a second rotatably mounted wheel 242, a hose inlet 222 and a tube frame 204. Further, the firehose cleaning apparatus 200 can comprise a power source 230.

In one aspect, the firehose cleaning apparatus 200 of the present disclosure is from about 15 inches to about 40 inches in height, such as from about 15 inches to about 20 inches in height, such as from about 20 inches to about 25 inches in height, such as from about 25 inches to about 30 inches in height, such as from about 30 inches to about 35 inches in height, such as from about 35 inches to about 40 inches in height. In one aspect, the firehose cleaning apparatus 200 of the present disclosure can be about 23 inches in height.

Further, in one aspect, the firehose cleaning apparatus 200 of the present disclosure is from about 15 inches to about 40 inches in length, such as from about 15 inches to about 20 inches in length, such as from about 20 inches to about 25 inches in length, such as from about 25 inches to about 30 inches in length, such as from about 30 inches to about 35 inches in length, such as from about 35 inches to about 40 inches in length. In one aspect, the firehose cleaning apparatus 200 of the present disclosure can be about 22 inches in length.

Additionally, in one aspect, the firehose cleaning apparatus 200 of the present disclosure is from about 10 inches to about 30 inches wide, such as from about 10 inches to about 15 inches wide, such as from about 15 inches to about 20 inches wide, such as from about 20 inches to about 25 inches wide, such as from about 25 inches to about 30 inches wide.

In one aspect, the firehose cleaning apparatus 200 of the present disclosure can have a width of about 13 inches.

The firehose cleaning apparatus 200 of the present disclosure can have a weight from about 30 pounds to about 90 pounds, such as from about 30 pounds to about 40 pounds, such as from about 40 pounds to about 50 pounds, such as from about 50 pounds to about 60 pounds, such as from about 60 pounds to about 70 pounds, such as from about 70 pounds to about 80 pounds, such as from about 80 pounds to about 90 pounds. In one aspect, the firehose cleaning apparatus 200 of the present disclosure can have a weight of about 66 pounds.

These and other modifications and variations to the present disclosure may be practiced by those of ordinary skill in the art, without departing from the spirit and scope of the present disclosure, which is more particularly set forth in the appended claims. In addition, it should be understood that aspects of the various embodiments may be interchanged both in whole or in part. Furthermore, those of ordinary skill in the art will appreciate that the foregoing description is by way of example only and is not intended to limit the present disclosure so further described in such appended claims.

What is claimed:

1. A firehose cleaning apparatus comprising:

a portable housing defining a washing chamber, the washing chamber having a generally circular configuration;

a tube frame, the tube frame having a substantially rectangular configuration;

a hose inlet on one side of the housing and a hose outlet on an opposite side of the housing, the hose inlet and hose outlet for feeding a firehose through the washing chamber;

a first rotating brush spaced from a second rotating brush within the washing chamber, wherein the first rotating brush and the second rotating brush are positioned to contact opposite sides of a firehose being fed through the hose inlet and out through the hose outlet;

a water inlet configured to be connected to a water source;

at least a first nozzle spaced from a second nozzle within the washing chamber, the first nozzle being positioned above a firehose being fed through the washing chamber, the second nozzle being positioned below a firehose being fed through the washing chamber, the first nozzle and the second nozzle being in fluid communication with the water inlet;

a power source for rotating the first rotating brush and the second rotating brush; and a water outlet for discharging liquid from the washing chamber.

2. The firehose cleaning apparatus of claim 1, wherein the first rotating brush and the second rotating brush are positioned to apply a force to a firehose being fed through the washing chamber to automatically advance a firehose through the washing chamber.

3. The firehose cleaning apparatus of claim 1, wherein the power source is a rechargeable battery removably held in the housing.

4. The firehose cleaning apparatus of claim 1, wherein the washing chamber further comprises a third nozzle and a fourth nozzle.

5. The firehose cleaning apparatus of claim 1, wherein the water outlet is positioned at the bottom of the washing chamber.

6. The firehose cleaning apparatus of claim 1, wherein the first nozzle and the second nozzle emit water at a pressure from about 60 psi to about 110 psi.

7. The firehose cleaning apparatus of claim 1, wherein the first rotating brush and the second rotating brush have a rotational speed from about 100 rpm to about 2000 rpm.

8. The firehose cleaning apparatus of claim 1, wherein the first rotating brush and the second rotating brush have a rotational speed from about 300 rpm to about 1000 rpm.

9. The firehose cleaning apparatus of claim 1, wherein the first rotating brush and the second rotating brush each have a plurality of brush bristles from about 2 inches to about 6 inches in length.

10. The firehose cleaning apparatus of claim 9, wherein the brush bristles are each from about 1/120 inches to about 3/10 inches in diameter.

11. The firehose cleaning apparatus of claim 9, wherein the brush bristles are comprised of nylon, polyester, or a combination thereof.

12. The firehose cleaning apparatus of claim 1, wherein the washing chamber is shaped as an octagon.

13. The firehose cleaning apparatus of claim 1, wherein the tube frame extends further out than the washing chamber.

14. The firehose cleaning apparatus of claim 1, wherein the housing comprises a retractable handle.

15. The firehose cleaning apparatus of claim 1, wherein the housing comprises an at least one extendable stabilizer.

16. The firehose cleaning apparatus of claim 1, wherein the housing comprises a rotatably mounted wheel enabling the user to move the apparatus.

17. A method for employing the firehose cleaning apparatus of claim 1 comprising:

connecting the apparatus to the water source;

feeding a firehose through the washing chamber;

washing a firehose with water emanating from the first nozzle and the second nozzle; and simultaneously removing the firehose contaminants with the first rotating brush and the second rotating brush.

18. The method of claim 17 further comprising presoaking a firehose with a cleaning composition prior to feeding a firehose through the washing chamber.

19. A firehose cleaning apparatus comprising:

a portable housing defining a washing chamber, wherein the vertex angles of the washing chamber are greater than the vertex angles of a square;

a tube frame, the tube frame having a substantially rectangular configuration;

a hose inlet on one side of the housing and a hose outlet on an opposite side of the housing, the hose inlet and hose outlet for feeding a firehose through the washing chamber;

a first rotating brush spaced from a second rotating brush within the washing chamber, wherein the first rotating brush and the second rotating brush are positioned to contact opposite sides of a firehose being fed through the hose inlet and out through the hose outlet;

a water inlet configured to be connected to a water source;

at least a first nozzle spaced from a second nozzle within the washing chamber, the first nozzle being positioned above a firehose being fed through the washing chamber, the second nozzle being positioned below a firehose being fed through the washing chamber, the first nozzle and the second nozzle being in fluid communication with the water inlet;

a power source for rotating the first rotating brush and the second rotating brush; and a water outlet for discharging liquid from the washing chamber.

* * * * *